United States Patent

[11] 3,610,635

[72] Inventors Morton Schiff; James Rosen, both of New York, N.Y.

[21] Appl. No. 860,952
[22] Filed Sept. 25, 1969
[45] Patented Oct. 5, 1971
[73] Assignee United States Research & Development New York, N.Y.

[54] CARD ADAPTER ATTACHMENT FOR CASSETTE TAPE RECORDER
30 Claims, 5 Drawing Figs.

[52] U.S. Cl. 274/4 J, 35/35 C, 179/100.2 T, 274/1 R
[51] Int. Cl. G11b 25/04, G11b 25/06
[50] Field of Search 35/35 C; 274/4 J; 179/100.2 T

[56] References Cited

UNITED STATES PATENTS

| | | | |
|---|---|---|---|
| 3,348,320 | 10/1967 | Brokaw | 35/35 C |
| 3,404,894 | 10/1968 | Kral | 274/4 J |
| 3,488,867 | 1/1970 | Lyon | 274/4 J |

*Primary Examiner*—Leonard Forman
*Assistant Examiner*—Dennis A. Dearing
*Attorney*—Hubbell, Cohen & Stiefel

ABSTRACT: A cassette tape recorder is adapted to record and play back a magnetic recording on an educational card by means of a plastic attachment which plugs into the tape recorder in the same manner as a tape cassette. The attachment comprises a horizontal base member with a rear edge that engages the cassette clamping spring, and an upstanding front wall which helps to define a card guide channel, and engages the front wall of the tape recorder cassette wall. A lockout projection at the rear of the base member engages the lockout feeler of the recorder to permit recording on the card, if desired. The front wall of the attachment is formed with cutouts to accommodate the recording and playback transducers and the tape drive pinch roller of the tape recorder, and curves away from the recording transducer so as to space the card from the protruding tape guides thereof. Behind the front wall of the attachment is an integrally formed resilient cantilever spring member having a card-abutting member thereon which bears resiliently against the rear surface of the card. As the card traverses the channel it is gripped between the pinch roller and the constant speed drive capstan of the tape recorder, resulting in constant speed drive of the card past the playback transducer for reproducing the auditory message recorded on the card. The attachment is also formed with a sideward projection for supporting the card, and a pair of clearance holes and a rectangular cutout which provide clearance respectively for the cassette locating pins and the supply and takeup reel spindles located on the deck of the tape recorder.

INVENTORS
MORTON SCHIFF
JAMES ROSEN

BY

ATTORNEYS.

INVENTORS
MORTON SCHIFF
JAMES ROSEN
BY
Hubbell, Cohen & Stiefel
ATTORNEYS.

INVENTORS
MORTON SCHIFF
JAMES ROSEN

BY

Hubbell, Cohen & Stiefel
ATTORNEYS.

CARD ADAPTER ATTACHMENT FOR CASSETTE TAPE RECORDER

BACKGROUND OF THE INVENTION

Field of the Invention

This invention relates generally to the field of magnetic recording and playback of auditory material. It is particularly directed to an attachment device which adapts a conventional cassette type magnetic tape recorder to magnetically record and play back information on cards.

DESCRIPTION OF THE PRIOR ART

Educational cards are used in various ways, as for example, vocabulary review in foreign language courses. Some of these cards are now made with auditory material recorded upon a strip of magnetically permeable material at the lower edge of the card, as well as some printed or pictorial material which matches it in content. For example, the pronunciation of a word in a foreign language may be recorded magnetically on the card, and the same word or a picture of the object which the word represents may be printed thereon.

In the past, special magnetic record and playback equipment has been required to use cards in this manner. The expense of providing this special equipment is considerable; and if each student in a class is to have his own equipment for recording on and playing back from cards in his own quarters, the expense is multiplied.

THE INVENTION

The present invention contemplates that educational magnetic card reading devices shall be made readily and cheaply available by simply converting a standard device which is available in any audio equipment outlet. Specifically, a simple and inexpensive plastic is used with an ordinary magnetic tape recorder, preferably a cassette recorder, to convert the recorder temporarily for magnetic card record and playback. After the language lesson is over, the attachment is easily removed from the tape recorder, immediately converting it back to conventional magnetic tape.

In concrete terms, the attachment fits into the tape storage space of the recorder, and provides a channel for guiding the card past the playback transducer. It also has provision for engaging the card with the tape drive of the recorder so that the card is pulled past the playback transducer at constant speed, resulting in reproduction of the audio message. The invention is particularly suited for use with the container-loaded type of tape recorder, since the card adapter can be designed to plug into the machine in place of the tape container, and to be just as easily removable after the language lesson is over.

DETAILED DESCRIPTION OF THE PREFERRED EMBODIMENT

Figure 1:
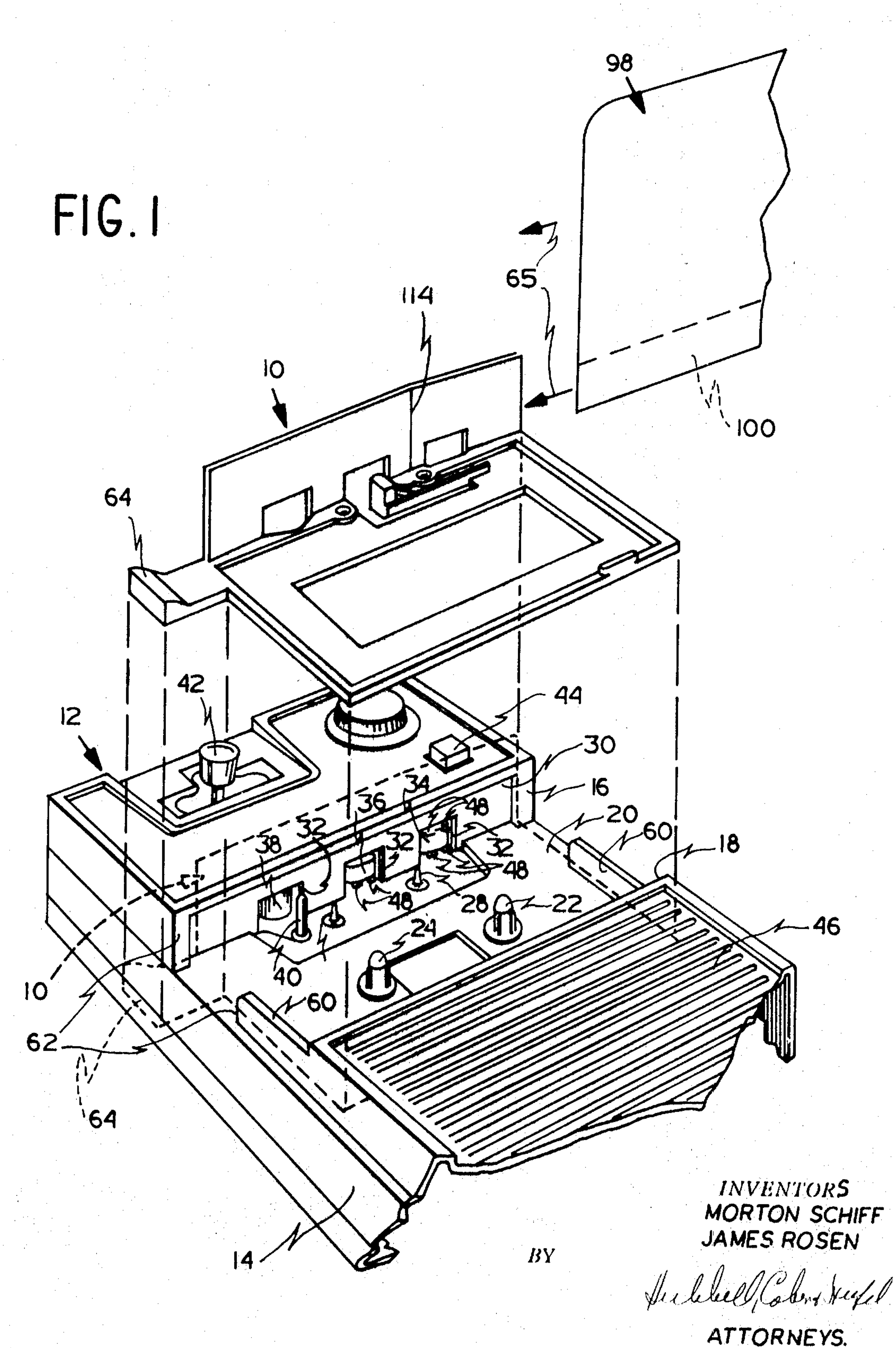
FIG. 1 is an exploded perspective view, with parts removed for clarity of illustration, of a conventional reel-to-reel cassette-type tape recorder, and a card adapter attachment in accordance with this invention which is designed for use therewith.

The following description will be made primarily with respect to a tape cassette machine in the playback mode. However, assuming the machine has the capability of both recording and playing back, it will be obvious to the skilled art worker that by operating the recording interlock button, the machine can be made to record through a combined record-playback transducer or head.

The attachment device 10 of this invention is designed for use with a conventional tape recorder, in particular a recorder of the type which is loaded by means of a plug-in tape container. At the present time there are two different types of container-loaded tape recorders on the market. One of these has an endless loop of tape within the container, and the other uses a reel-to-reel arrangement, with a supply reel and a takeup reel mounted within the container. The invention is applicable to both types of recorder, but the preferred embodiment illustrated in the drawings and described in detail in this specification is designed for use with a tape recorder which accepts a reel-to-reel type of container, commonly known as a cassette.

A tape recorder 12 of the latter type typically comprises a plastic casting 14 which is relieved at 16 and 18 to form a storage space or well which accepts the magnetic tape cassette (not illustrated). Walls 60 define the side boundaries of the storage well 16, 18. Underlying the well is a horizontal deck 20, from which project upwardly a pair of rotatable spindles 22, 24, designed to be received within the spindle openings of the supply reel and takeup reel respectively inside the cassette. A pair of cassette locating pins 28 also project upwardly from the deck 20, and are designed to be received within a pair of mating cassette openings in order to locate the cassette properly within the well 16, 18.

At the front storage well 16, 18 the tape recorder has a well 30 formed with openings 32 through which protrude a magnetic record-playback transducer 36 (hereinafter called "-playback transducer 36"), a magnetic erasing transducer 34, and a tape drive pinch roller 38. A constant speed tape drive capstan 40 protrudes upwardly from the deck 20, and is driven at a constant speed by a motor (not illustrated) located below the deck 20. As is well understood, a conventional magnetic tape cassette is designed so that the tape is unwound from a supply reel surrounding the spindle 22 and fed past the erase transducer 34 and the playback transducer 36 in that order. Then the tape passes between the drive capstan 40 and pinch roller 38, and returns to a takeup reel surrounding the spindle 24. For recording or playback operation, the pinch roller 38 is moved rearwardly, by means of a manual operating handle 42, until it protrudes through its associated well opening 32 and into opposed driving relation with the capstan 40. In this manner the pinch roller 38 and capstan 40 grip the tape between them, so that the rotation of the capstan is able to pull the tape off the supply reel and past the transducers in the manner described. The takeup reel spindle 24 is overdriven by the motor through a slip clutch to take up the tape emerging from the drive mechanism 38, 40.

As the tape moves past the erase transducer 34, any old material recorded on the tape is erased provided the recording interlock button 44 is depressed. If that button is not depressed, then the machine 12 operates in the playback mode as is presently being described, in which transducer 34 is open circuited and transducer 36 reeds the magnetic signal recorded upon the tape. This signal is played back through a conventional electronic amplification system driving a loudspeaker located underneath a grill 46.

Transducers 34 and 36 are normally provided with upper and lower tape guide projections 48, although the particular machine illustrated in the drawing has had the upper tape guide projections only removed from the playback transducer 36 for reasons which will be apparent later.

Figure 4:
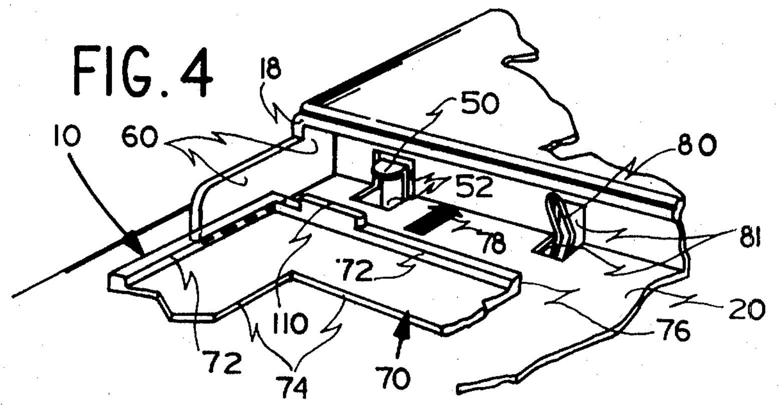
FIG. 4 is a fragmentary perspective view of the same tape recorder and the attachment of this invention, illustrating the engagement between the recording function lockout projection on the attachment device and a cooperating lockout feeler on the tape recorder which is designed to be actuated by a prerecorded tape cassette.
Figure 5:
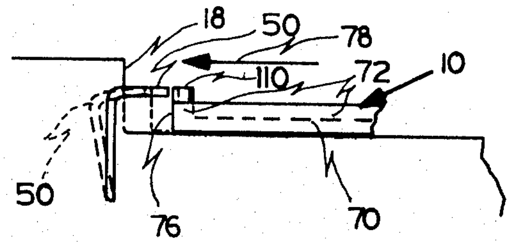
FIG. 5 is a fragmentary side elevational view, with parts removed for clarity of illustration, of the same elements as in FIG. 4, further illustrating the cooperation therebetween.

As best seen in FIGS. 4 and 5, at the rear of the cassette well 16, 18 the machine 12 has a lockout feeler 50 which is movable rearwardly from the solid line position of FIGS. 4 and 5 to the dashed line position of FIG. 5. Openings 52 are formed in the rear well 54 of the storage well, and in the deck 20, to permit such motion of the lockout feeler 50. When not driven rearwardly, the feeler 50, by means of a well-known mechanism which is not illustrated here, interferes with the recording interlock button 44, thus preventing the tape recorder 12 from operating in the recording mode. When driven rearwardly, no interference with the recording mode is interposed. Prerecorded tape cassettes, which the user would not wish to erase inadvertently, are conventionally provided with an appropriate opening on their rear edge to avoid engaging the lockout feeler 50.

The attachment 10 of this invention may be used on any conventional cassette tape recorder, provided the sidewalls 60 do not interfere with the card support 64. This absence of interference can be achieved by obtaining a recorder in which the sidewalls are omitted. In the alternative, if such sidewalls are present, portions of them can be removed to accommodate the card support and permit the card to travel its full length. In addition, the upper tape guide projections 48 must be removed from the upper margin of the playback transducer 36 only. This modification does not affect the utility of the tape recorder 12 for normal recording and playback of conventional magnetic tapes.

Figure 2:
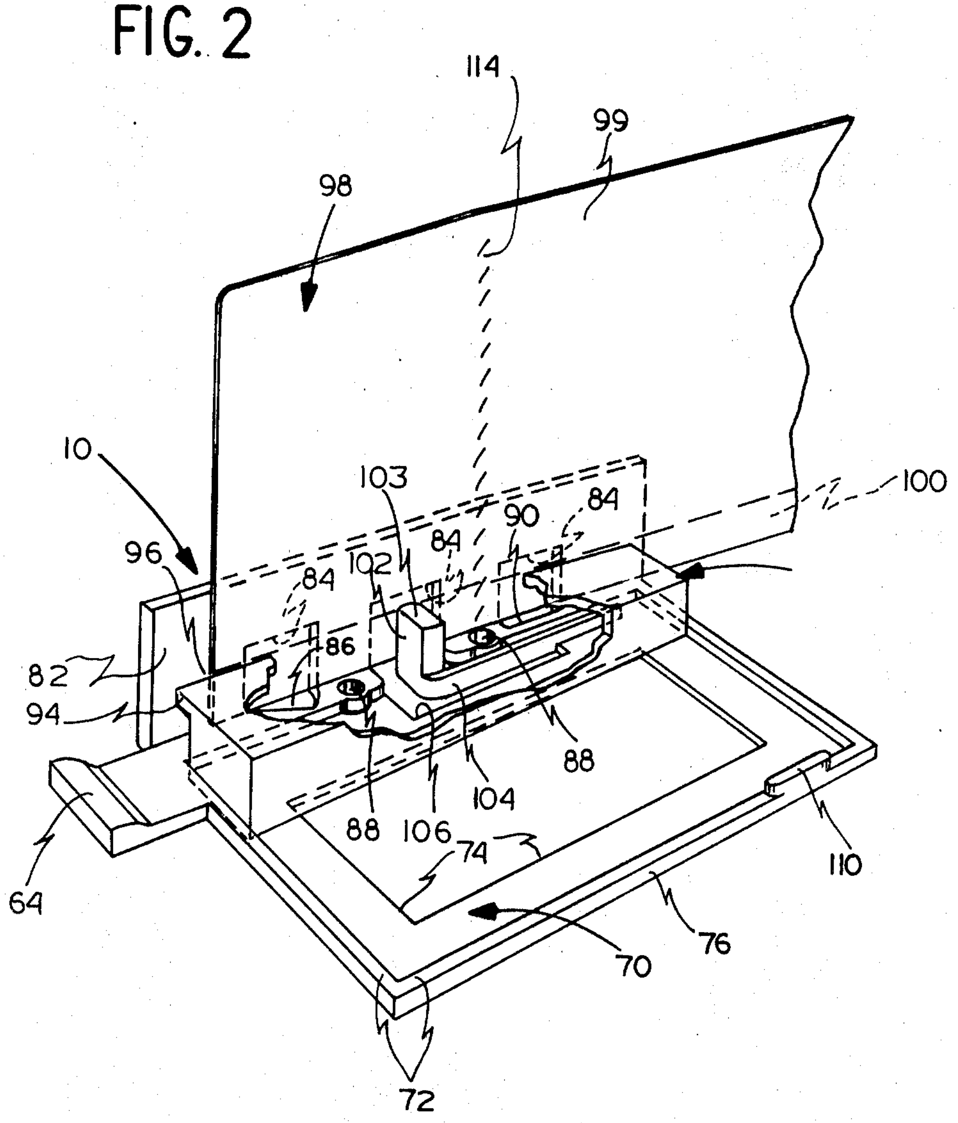
FIG. 2 is a perspective view of the attachment device of FIG. 1, with an educational card bearing a magnetic strip inserted in the card guide channel thereof.

As best seen in FIG. 2, the attachment 10 preferably comprises two pieces 70 and 92 which are individually molded of conventional plastic material. Suitable plastic materials include thermoplastics, e.g., polyolefins, such as polyethylene, polypropylene and the like, polyoxylmethylene resins such as Delrin, ABS (acrylonitrile-butadiene-styrene) resin, polyamides and the like, as well as thermoset resins such as urea-formaldehyde, phenylformaldehyde, unsaturated alkyds, etc. Member 70 is a rectangular base formed with a marginal stiffening rib 72 along all four edges. The base member 70 is designed to be inserted in place of a conventional tape cassette into the storage well 16, 18; with the base member horizontally overlying the deck 20. In the central region of the base member there is a large rectangular opening 74 designed to provide clearance for the tape reel spindles 22 and 24, which perform no function when the machine is used with cards instead of tape.

To load the attachment 10, its rear edge 76 is dropped down upon the deck 20, as seen in FIGS. 4 and 5, and driven horizontally against the rear wall 54 of the cassette well, as indicated by arrows 78. As a result, the attachment engages a clamping spring 80, which is intended to clamp a conventional tape cassette within the well 16, 18. Care is taken to see that the base member 70 has the same length and width dimensions as the conventional tape cassette. As a result, the base member is received easily between the sidewalls 60, but must be forced into place between the front wall 30 and the clamping spring 80 of the tape recorder. Thus the spring, which is movable within openings 81 formed in the rear wall 54 and deck 20, keeps a continuous forward clamping pressure upon the attachment 10.

At the front edge of the base member 70 there is provided an upstanding wall 82 which the pressure of the clamping spring 80 presses into engagement with the front wall 30 of the tape recorder. The wall 82 is formed with three openings 84 which register with the openings 32 in the tape recorder wall 30 and are also designed to accommodate the erase transducer 34, playback transducer 36, and pinch roller 38. Just behind the front wall 82, the base member 70 is formed with a clearance opening 86 for the drive capstan 40 and a pair of openings 88 which cooperate for locating purposes with the pins 28 of the tape recorder. Finally, the base member 70 and stiffening rib 72 are relieved at 90 in order to provide clearance for the lower tape guide projections 48 of the recording transducer 34.

The other member 92 which forms the assembly of the attachment 10 is substantially rectangular cover which may be assembled with the base member 70, for example by glueing. The cover 92 rests on the top surface of the base member 70, fitting between the sides of the stiffening rib 72, and abutting against front of the stiffening rib. When the cover member 92 is thus located with respect to the stiffening rib 72, a lip 94 projecting forwardly from the cover member approaches the front wall 82 to define therebetween a guide channel 96. This channel receives the thickness of the substantially planar card 98 when the card is oriented vertically and inserted edgewise into the channel as indicated by arrows 65. The reader will note that the cover member 92 is broken away in the view of FIG. 2, and deleted entirely from the view of FIG. 1, for the sake of clarity of illustration.

The card 98 comprises a large area 99 upon which pictorial or written material is located, and also has a strip 100 of permeable material extending horizontally across the lower edge thereof to retain a magnetic record of words or other sounds associated with the material in the area 99. In order for the material recorded on the magnetic strip 100 to be read by the playback transducer 36, card 98 must be maintained in close proximity to the transducer while it is moved horizontally through the channel 96. The channel width exceeds the thickness of the card 98, and the job of keeping the card in close proximity to the transducer is performed by a card abutting member 102 at the extremity of a resilient cantilevered leaf spring arm 104. The front surface 103 of member 102 has a vertical cylindrical curvature which allows the card 98 to cam the member rearwardly as it slips horizontally into the channel 96. The member 102 and the spring arm 104 are easily and inexpensively formed as integrally molded parts of the base member 70, and have a latitude of horizontal movement within an L-shaped opening 106 formed in the base member. The cover member 92 cooperates with the front wall 82 and base member 70 to form a protective housing for the moveable elements 102 and 104, which protects them from possible damage.

Along the rear edge of the attachment device 10, the upper surface of the stiffening rib 72 is provided with an upwardly projecting lockout key 110 which is positioned to strike the lockout feeler 50 of the tape recorder. Thus, when the attachment 10 is inserted into the tape cassette well 16, 18 in the manner described above, the key 110 drives the feeler 50 rearwardly, to prevent interference with the record interlock button 44, and thus to permit the tape recorder to record the educational card 98. To erase recorded material, a permanent magnet may be moved over strip 100. This may be desirably achieved by affixing a permanent magnet to the outer case and moving strip 100 over such magnet.

Once the attachment 10 has been inserted into the cassette well 16, 18, the educational card 98 is oriented vertically and introduced edgewise into the channel 96 as indicated by arrows 65, with the magnetic strip 100 at the lower edge thereof so as to register with the playback transducer 36. The educational card 98 should be kept away from the erase transducer 34 in order to prevent it from being abraded by the tape guide projections 48 thereof. In order to accomplish this, the right-hand end of both the front wall 82 and the lip 94 have a slight rake so that the card channel 96 slants rearwardly from an inflection point 114. As a result, the portion of the educational card 98 between the inflection point 114 and the entrance end 116 of the card channel 96 is held rearwardly out of contact with the tape guide projections 48 of the erase transducer 34.

Figure 3:
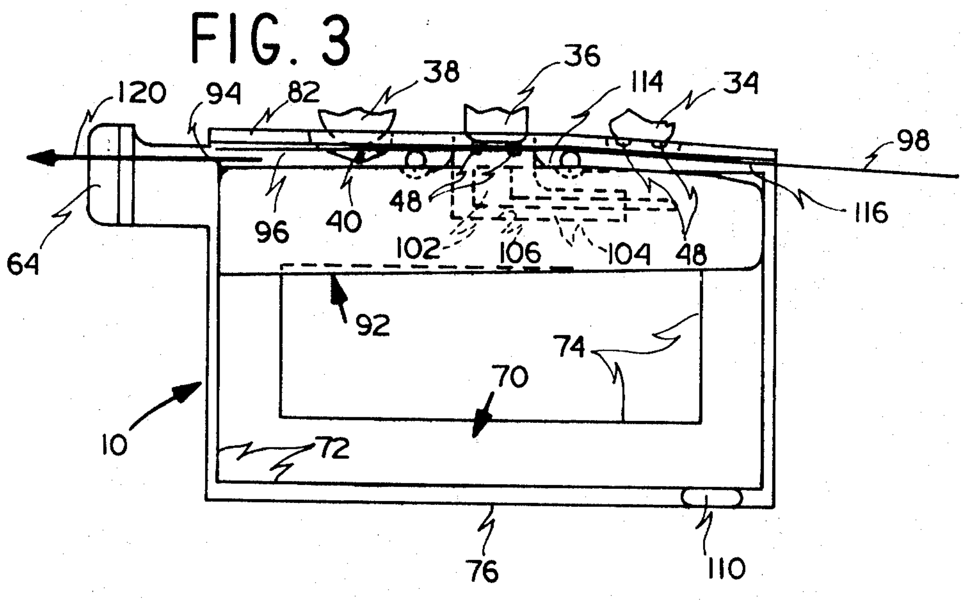
FIG. 3 is a top plan view of the same tape recorder attachment, pictured in operative relationship with certain elements of the same tape recorder, as a magnetically recorded educational card is driven through the card guide channel by the drive mechanism of the recorder.

That portion of the card 98 which is to the left of inflection point 114, however, is in operative proximity to the playback transducer 36, as clearly seen in FIG. 3. The card 98 enters the channel 96 from right to left, camming past the vertical cylindrical curvature of the surface 103 and riding over the lower tape guide projections 48 of the playback transducer 36. But since the vertical height of the card 98 is much greater than the width of a conventional magnetic recording tape, the upper projections of transducer 36 must be removed in order to permit the card 98 to fit snugly against the transducer face. The removal of these upper tape guide projections makes little difference to the operation of the machine 12 as a conventional tape recorder, since the tape cassette itself and the upper tape guide projections 48 of the erase transducer 34 both contribute to the proper vertical alignment of the magnetic tape when a conventional cassette is loaded into the machine.

After the card is introduced into the channel 96 from the entrance end 116, it is fed manually to the left as seen in the drawings until the leading edge of the card becomes engaged between the continuously rotating drive capstan 40 and the pinch roller 38, which is in contact with the capstan when the control handle 42 is displaced rearwardly to activate the tape transport of the machine 12. As a result, the card 98 is gripped between elements 38 and 40 and is pulled to the left, as indicated by arrow 120 in FIG. 3, in order to move the card the rest of the way through the channel 96. Thus, the driving elements 38 and 40 grip the card 98 therebetween, and advance it at constant speed past the playback transducer 36, in precisely the same manner as a conventional cassette tape.

When the trailing edge of the card 98 passes the drive elements 38 and 40, the card then slips from the channel 96 and a new one can be inserted manually. When the entire lesson has been finished, the user lifts the attachment 10 upwardly releasing the attachment 10 from the clamping spring 80 and drawing it upwardly out of the cassette well 16, 18. Once the attachment is out of the well, the machine is returned to its normal condition and is immediately ready for use as a conventional recorder and player of cassette-loaded magnetic tapes.

As already noted the above description has primarily emphasized the playing back of recorded material on the card 98. However, the cassette machine 14 has been described as a combined tape recording-playback device. Thus, the same attachment in combination with the same machine can be employed to record information on the magnetic strip 100 of the card 98 merely by the operation of the record interlock button 44. As already noted, key 110, having already been included in attachment 10, drives lockout feeler rearwardly upon positioning of attachment 10 in the tape recorder, whereby to prevent lockout feeler 50 from disabling the record interlock button 44, which would prevent the record mode of operation. Thus, the attachment 10 permits record as well as playback.

Naturally, the device could be employed solely as a playback device and in such event there would be no need for any recording capability in the machine. Likewise, the attachment may be used with a recording machine that has no playback capability.

It will now be appreciated that the invention provides a very inexpensive and easily manufactured attachment which converts any conventional cassette tape recorder into an educational card recording and reading device. Yet the attachment is instantly removable to restore the machine to use as a conventional tape cassette machine.

The embodiments of the invention in which an exclusive property or privilege is claimed are defined as follows:

1. In combination with an audio tape device comprising a playback transducer, a storage space for accommodating a supply of elongated audio record tape in wound form, and drive means for pulling said tape from the winding and moving it at a constant playback speed past said playback transducer; an attachment for adapting said audio device to play back a recording on a substantially planar record card, said attachment comprising:

a base member removably disposed within said tape storage space of said audio device in a predetermined position;

means on said base member defining a guide channel for said card to slide through, and arranged so that the path of said card through said channel goes past said playback transducer and said drive means, said guide channel defining means being configured to provide operative access for said playback transducer to said card and for said drive means to said card, whereby said drive means drives said card through said guide channel past said transducer at said constant speed to play back the recording on said card.

2. The combination of claim 1; wherein said tape storage space is defined by a horizontal deck, said constant speed drive means includes a driven capstan rising vertically from said deck and a pinch roller movable horizontally into opposable relation with said capstan for drivingly gripping said record tape therebetween; wherein:

said base member horizontally overlies said deck;

said channel-defining means comprises a wall upstanding from said base member to define a front boundary of said channel;

said wall is configured by being relieved to allow said record card to have access to said playback transducer and pinch roller;

and said base member is configured to permit said capstan to project upwardly at a location immediately behind said channel;

whereby said pinch roller moves horizontally through said wall relief into contact with said record card in said channel to press said card into driving engagement with said capstan.

3. The combination as in claim 2; wherein said audio tape device is of the reel-to-reel type in which supply and takeup spindles project upwardly from said deck; wherein:

said base member is relieved to provide clearance for said spindles.

4. The combination as in claim 2, further comprising:

means for resiliently engaging a record card to maintain a biasing pressure on said record card for urging it into operative relationship with said transducer.

5. The combination as in claim 4, wherein:

said base member has a sufficiently heavy cross section at least at some locations to be substantially rigid;

said resilient engaging means is a cantilevered leaf spring arm integrally joined at one end to said base member and extending substantially parallel to said card guide channel; and said arm has a sufficiently thin cross section in a direction transverse to said channel to be resiliently flexible in that direction.

6. The combination as in claim 5, wherein said card biasing means further comprises:

a card-abutting member in the form of an enlarged head at the free end of said cantilevered spring arm.

7. The combination as in claim 6 wherein:

said card-abutting member is formed with a vertically cylindrically curved surface presented to the record card in said channel whereby to permit the leading edge of said card to cam past an abutting member on initial insertion of said card horizontally into said channel.

8. The combination as in claim 2, wherein said wall relief to provide card access to said playback transducer and said pinch roller is at least one aperture in said wall, and the base member is configured by a clearance opening to permit the upward projection of said capstan.

9. The combination as in claim 8, further comprising a cantilevered arm operatively connected at one end to said base and extending substantially parallel to said channel defining means for engaging said card in said channel, the free end thereof being movable through said wall aperture in register with said transducer, and means for resiliently biasing the free end of said arm transverse of said channel and toward said transducer.

10. For use with an audio tape device comprising a playback transducer, a storage space for accommodating a supply of elongated audio record tape in wound form, and drive means for pulling said tape from the winding and moving it at a constant playback speed past said playback transducer;

an attachment for adapting said audio device to play back a recording on a substantially planar record card, said attachment comprising:

a base member sized and shaped to be received within said tape storage space in a predetermined position;

means on said base member defining a guide channel for said card to slide through, and arranged so that the path of said card through said channel goes past said playback transducer and said drive means, said guide channel defining means being configured to provide operative access for said playback transducer to said card and for said drive means to said card;

means for engaging a card in said channel for urging said card into operative relationship with said transducer;

whereby said drive means drives said card through said guide channel past said transducer at said constant speed to play back the recording on said card.

11. An attachment as in claim 10, wherein said means for engaging said card is a cantilevered arm operatively connected at one end to said base and extending substantially parallel to said channel defining means, and means for resiliently biasing the free end of said arm transverse of said channel and toward said transducer.

12. An attachment as in claim 10, wherein said tape storage space is defined by a horizontal deck, said constant speed drive means includes a driven capstan rising vertically from said deck and a pinch roller movable horizontally into opposable relation with said capstan for drivingly gripping said record tape therebetween; wherein:

said base member horizontally overlies said deck;

said channel-defining means comprises a wall upstanding from said base member to define a front boundary of said channel;

said wall is configured by being relieved to allow said record card to have access to said playback transducer and pinch roller;

and said base member is configured to permit said capstan to project upwardly at a location immediately behind said channel;

whereby said pinch roller moves horizontally through said wall relief into contact with said record card in said channel to press said card into driving engagement with said capstan.

13. An attachment as in claim 12, wherein said audio tape device is of the reel-to-reel type in which supply and takeup spindles project upwardly from said deck; wherein:

said base member is relieved to provide clearance for said spindles.

14. An attachment as in claim 12, wherein:

said base member has a sufficiently heavy cross section at least at some locations to be substantially rigid;

said card-engaging means is a cantilevered leaf spring arm integrally joined at one end to said base member and extending substantially parallel to said card guide channel; and said arm has a sufficiently thin cross section in a direction transverse to said channel to be resiliently flexible in that direction.

15. An attachment as in claim 14, wherein said card biasing means further comprises:

a card-abutting member in the form of an enlarged head at the free end of said cantilevered spring arm.

16. An attachment as in claim 15, wherein:

said card-abutting member is formed with a vertically cylindrically curved surface presented to the record card in said channel whereby to permit the leading edge of said card to cam past abutting member on initial insertion of said card horizontally into said channel.

17. An attachment as in claim 16 wherein:

said base member is formed with a biasing means clearance opening;

and said spring arm is disposed for flexing movement within said opening.

18. An attachment as in claim 17 wherein:

said biasing means clearance opening is L-shaped, and has two legs extending respectively substantially parallel and transversely to said card guide channel;

said spring arm is disposed longitudinally in said parallel leg of said L;

and said card-abutting member is disposed for movement within said transverse leg of said L.

19. An attachment as in claim 18 wherein:

said transverse leg of said L-shaped opening communicates with said playback transducer access relief of said front wall.

20. An attachment as in claim 10, further comprising:

cover means cooperating with said base member and said front wall substantially to enclose said card-biasing means.

21. An attachment as in claim 20 wherein:

said channel-defining means comprises a surface formed on said cover means and spaced rearwardly from said front wall a sufficient distance to accommodate the thickness of said record card therebetween.

22. An attachment as in claim 10; for use with an audio tape device having a recording transducer which is formed with rearwardly projecting tape guides and is located upstream from said playback transducer relative to the direction of tape travel; wherein:

said front wall slants rearwardly past said recording transducer whereby to hold a record card which is within said channel rearwardly out of contact with said transducer tape guide projections.

23. An attachment as in claim 10 further comprising:

means on said base member to interfit releasably with said audio device in a manner to retain said attachment in said predetermined position in said tape storage space during card playback.

24. An attachment as in claim 23; for use with an audio tape device of the container-loading type having means for locating and for removably and replaceably clamping an audio tape container in said tape storage space in a manner to maintain the audio tape which is within said container in operative engagement with said playback transducer and drive means; wherein:

said interfitting means are arranged to cooperate with said container locating and clamping means of said audio tape device whereby to removably and replaceably clamp said attachment in said tape storage space in a manner to maintain said card channel thereof in position for operative engagement between a record card which is in said channel and said playback transducer and drive means.

25. An attachment as in claim 24, further comprising:

a card support projecting laterally from said base member a sufficient distance to project beyond the side of said audio tape device when said attachment is received within said tape storage space.

26. An attachment as in claim 25; for use with an audio tape device having a front wall located adjacent said playback transducer and drive means and defining a front boundary for said tape storage space, sidewalls defining the side boundaries of said space, and a clamping spring at the rear of said space acting horizontally forwardly to clamp a tape container against said front wall; wherein:

said base member is sized and shaped to be received between said sidewalls and to be clamped against said front wall by said clamping spring, said sidewalls being out of interfering relation with said path of said card.

27. An attachment as in claim 26; for use with an audio tape recorder and playback device having lockout means for preventing the disabling of the recording capability thereof, including a lockout feeler at the rear of said tape storage space mounted for horizontal rearward motion in response to insertion into said tape storage space of a prerecorded tape container having a lockout key thereon; said attachment further comprising:

a lockout key at the rear of said base member for engaging and driving said lockout feeler rearwardly to permit the recording capability of said audio tape device upon insertion of said attachment into said tape storage space.

28. An attachment as in claim 26, further comprising:

a front wall upstanding from said base member at the front edge thereof for engagement against said audio tape device front wall in response to the urging of said clamping spring against said base member.

29. An attachment as in claim 26; for use with an audio device in which a horizontal deck underlies said tape storage space, and locating pin means project upwardly from said deck to made with locating hole means on said tape container; wherein:

said base member is formed with locating hole means arranged to receive said locating pin means.

30. For use with an audio tape device comprising a playback transducer, a storage space for accommodating a supply of elongated audio record tape in wound form, and drive means for pulling said tape from the winding and moving it at a constant playback speed past said playback transducer; an attachment for adapting said audio device to play back a recording on a substantially planar record card, said attachment comprising:

a base member sized and shaped to be received within said tape storage space in a predetermined position;

an upstanding wall on said base member for defining a guide channel for said card and extending in a direction so that when said base member is disposed in said predetermined position said channel goes past said playback transducer and said drive means, means on said attachment for urging a card in said channel into operative relation with said transducer, said wall being shaped to permit operative engagement between a card in said channel and said drive means.

Notice of Adverse Decision in Interference

In Interference No. 98,010, involving Patent No. 3,610,635, M. Schiff and J. Rosen, CARD ADAPTER ATTACHMENT FOR CASSETTE TAPE RECORDER, final judgment adverse to the patentees was rendered July 18, 1974, as to claims 1–4, 8, 10, 12, 13, 20, 21, 23 and 30.

[*Official Gazette December 24, 1974.*]